Oct. 8, 1968    R. E. LATHAM ETAL    3,404,902
DEFLECTABLE LIP SEALING CONNECTION HAVING SPOILER FEATURE
Filed Nov. 9, 1965    2 Sheets-Sheet 1

INVENTORS
RAY E. LATHAM
ROBERT T. BROWN
CHARLES A. BOLLFRASS
BY Cushman, Darby & Cushman
ATTORNEYS Oct. 8, 1968 R. E. LATHAM ET AL 3,404,902
DEFLECTABLE LIP SEALING CONNECTION HAVING SPOILER FEATURE
Filed Nov. 9, 1965 2 Sheets-Sheet 2

INVENTORS
RAY E. LATHAM
ROBERT T. BROWN
CHARLES A. BOLLFRASS
BY Cushman, Darby & Cushman
ATTORNEYS

United States Patent Office 3,404,902
Patented Oct. 8, 1968

3,404,902
DEFLECTABLE LIP SEALING CONNECTION HAVING SPOILER FEATURE
Raymond E. Latham, Robert T. Brown, and Charles A. Bollfrass, Houston, Tex., assignors to Gray Tool Company, Houston, Tex., a corporation of Texas
Filed Nov. 9, 1965, Ser. No. 507,002
16 Claims. (Cl. 285—14)

ABSTRACT OF THE DISCLOSURE

A stressed sealing arrangement wherein the annular sealing ring having tapered, annular, elastically deflectable sealing lips and a radially directed rib is provided with an axially opening groove in at least one rib axially presented face, the groove extending across the entire radial extent of all of that face which will abut another part, for assuring that when sealing is accomplished using the ring it is accomplished by the lips, rather than by abutment of the rib face with the other part.

---

The present invention relates to sealing rings and sealed couplings and more particularly to those having lips which elastically deflect to seal and have leak detection means.

Sealing arrangements to which the present invention most particularly pertains are those wherein two or more members of a sealing coupling have annular sealing surfaces which in an unstressed state taper or curve at slightly different angles. In order to effect a seal, such members are urged axially toward one another whereupon the lip on which at least one of the surfaces is carried deflects so that the two or more sealing surfaces are in stressed sealing engagement with one another. In order to limit the deflection of the seal lips so that undesired plastic deformation of the lips or crushing of the members will not occur positive stop means are provided which in many instances function by limiting axial movement of the members toward one another. In some cases the positive stop means are most conveniently provided by annular, radially directed shoulders on the various members, the shoulders being positioned to abut to prevent further movement of the members toward one another after a stressed seal having the designed stress has been accomplished.

The advantages of a stressed seal over a mere unstressed abutment of smooth surfaced annular seals should at this point in time be well known to those having skill in the seal art. One advantage which should be emphasized is that, whereas temperature and pressure cycling of two adjacent parts sealed to one another by an unstressed seal can easily, by differential expansion and contraction of the parts cause leakage and failure of the seal, such cycling where a stressed seal has been provided will usually not lead to leakage and failure. Accordingly, as nuclear, chemical and petroleum technology have advanced to points where temperature and pressure extremes are encountered more frequently and where the disaster that leakage and failure would cause, be more unacceptable, the use of stressed seals has increased in proportion to that of unstressed seals.

However, one factor has led to apprehension in certain users or potential users regarding the reliability of some stressed seals, although most are considered highly reliable by those whose use of such seals has been extensive. This factor is the possibility that the sealing surface on either of the intended sealing surfaces of the stressed seal might be damaged or improperly machined, unknown to the user but because such great force is employed to bring the seal carrying parts axially toward one another that a surface to surface seal might be effected by the abutment of the stop means even though one is not effected at the sealing lips. In such instance test pressurization of the interior of the sealed parts could indicate that a seal had been formed, but would not indicate that the seal had been formed at an undesired location. Upon receiving favorable test results the user might put the sealed joint into service only to find, upon temperature or pressure cycling, that the stop means to stop means seal leaks or fails completely because it is not formed by elastic flexing of the lip elements as was desired.

It is therefore an object of the invention to provide a stressed sealing arrangement of the type described wherein means are provided to ensure that if a seal is effected, it is effected between the elastically deflected lip and its intended seat and to ensure that the seal which a pressure test of the parts indicates has been effected is not effected between abutting stop means where it could fail were the arrangement put in service.

A further object of the invention is the provision of an annular sealing ring of elastic hard metal or the like having tapered annular sealing lips and a radially directed rib provided with means to ensure that sealing accomplished while employing the ring takes place at the lips rather than at the axially directed faces of the radial rib.

These and other objects of the present invention should become more clearly apparent during the course of the following detailed explanation which relates to the several embodiments of the invention which are illustrated in the attached drawings.

Figure 1:
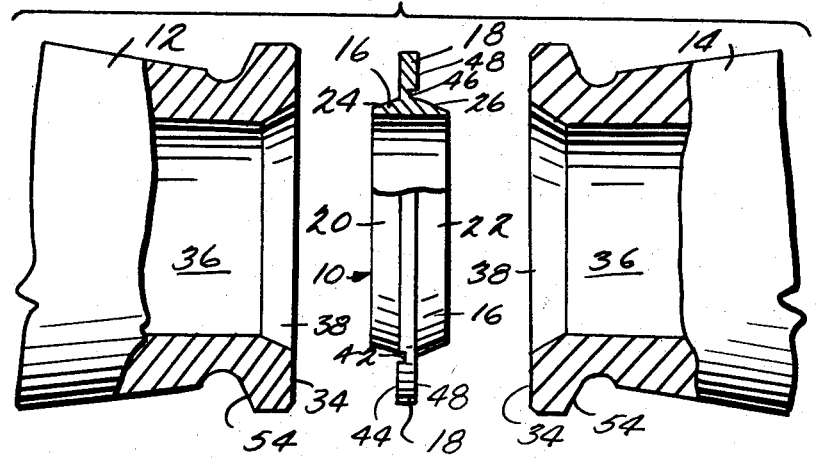
FIGURE 1 is an exploded longitudinal sectional view of a coupling employing the notched sealing ring of the present invention, sealing being effected by drawing the parts axially toward one another.

A sealing ring 10 configured in accordance with the principles of the present invention is shown in FIGURE 1 as a potential member of a sealed coupling also including conduits 12 and 14. The sealing ring 10 is preferably composed of elastic hard metal or the like, although rings of other material such as Bakelite or other synthetic plastic materials, hard rubber or the like could be used.

The sealing ring 10 includes a radially inner, annular, axially extending flange 16 and an integral generally radially outwardly extending central rib 18 which divides the flange 16 into oppositely axially directed lips 20, 22. Each lip 20, 22 has a frusto-conically curved annular sealing surface 24, 26 thereon on its radially outer face 28, 30 each of which flares toward the rib 18. The sealing surfaces 24, 26 each form an acute angle with respect to the longitudinal axis of the sealing ring 10. The ring 10 has a central through bore 32.

Each conduit 12, 14 has an axial radially extending end surface 34 coaxially presented toward the sealing ring and a throughbore 36 which is coaxial with the end surfaces 34. Adjacent and toward the end surfaces 34 each conduit throughbore 36 enlarges frusto-conically defining annular sealing surfaces 38 which flare toward the end surfaces 34.

Figure 3:
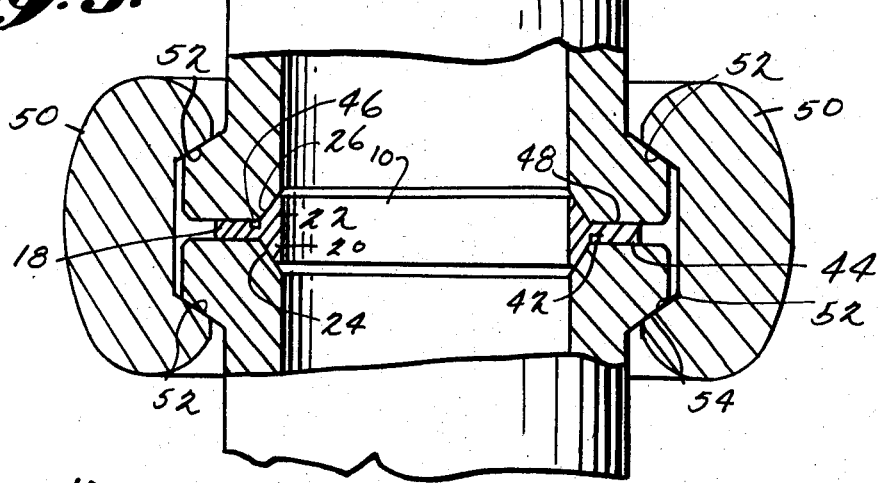
FIGURE 3 is a longitudinal sectional view of a coupling employing the sealing ring of FIGURES 1 and 2 a segmental clamp having been employed to draw the parts into sealing engagement.

It is important to notice that in their unstressed state as depicted in FIGURE 1, the sealing ring sealing surfaces 24 and 26 extend at a slightly more acute angle with respect to the longitudinal axis of the fluid confining members 10, 12, 14 than the sealing surfaces 38 of the conduits 12, 14. Accordingly, because the lips 20 and 22 are elastic and flexible and the exterior diameters of the lips 20, 22 at their radially outer extent is approximately equal to the diameters of the conduit throughbore end surface apices 40, the lips 20 and 22 will deflect as the parts 10, 12 and 14 are brought axially toward one another into engagement as shown in FIGURE 3 and the lip sealing surfaces 24 and 26 will be brought into coextensive stressed sealing engagement with the conduit sealing surfaces 38 (see FIGURE 3). Further details and the advantages of the structure so far described can easily be discerned from the United States patents to Watts et al. Nos. 2,766,829, 2,766,998 and 2,766,999 whose disclosure is incorporated herein by reference.

Figure 2:
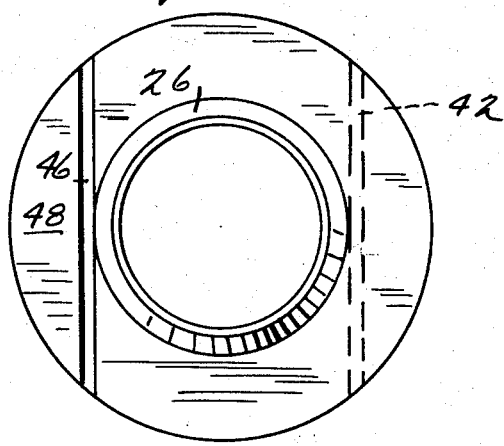
FIGURE 2 is an end view of the notched sealing ring shown in FIGURE 1.

Turning now to FIGURE 2, it can be seen that a first groove 42 is formed in the end surface 44 of the rib 18. A second groove 46 is formed in the opposite end surface 48 of the rib 18. The grooves 42 and 46 extend across the entire radial extent of the rib surfaces 44 and 48 respectively. As shown the grooves 42 and 46 are parallel to one another and form cords of the annular rib 18 that are tangential to the bases of the lips 20 and 22 accordingly the grooves can easily be milled, sawed or otherwise formed in the rib 18 in one or two steps using cutting means or the like whose path does not intersect the lip sealing surfaces 24, 26. Accordingly, the grooves can be formed economically and with but slight prospect that a sealing surface 24, 26 will be marred or damaged in the process.

It should now be apparent that when the parts 10, 12, 14 are brought axially together as shown in FIGURE 3, the grooves 42 and 46 effectively provide "spoilers" to prevent even a narrow annular band of sealing between the conduit end surfaces 34 and the rib surfaces 44 and 48, the latter acting as stop means which prevent further drawing of the parts 12 and 14 toward one another as might otherwise plastically deform the lips 20, 22.

In the structure shown in FIGURE 3, the members 10, 12 and 14 have been drawn axially into stressed sealing engagement by a segmental, radially expansible and contractile clamp 50 having internal facing annular wedging surfaces 52 which engage complementary exterior surfaces 54 on the conduits 12 and 14 adjacent the end surfaces 34.

Further details of the clamp 50; as well as alternative means for bringing the parts 10, 12 and 14 to the condition shown in FIGURE 3 can be seen in the three above-mentioned Watts et al. patents; in the U.S. patent to Watts, No. 3,181,901 and in the commonly assigned U.S. patent applications of Watts et al., Ser. No. 128,174, filed July 31, 1961; Crain et al., Ser. No. 388,775, filed Aug. 11, 1964; Brown, Ser. No. 396,641, filed Sept. 15, 1964; and Latham et al., Ser. No. 414,245, filed Nov. 27, 1964.

When a joint has been effected as in FIGURE 3, and pressurized fluid directed into the throughbores of the members 10, 12 and 14 the integrity of the joint can be tested by conventional means, for instance, by communicating a pressure gauge with the pressurized region and observing whether the pressure within the pressurized region remains constant. Alternatively, conventional leak detecting substances can be applied to the joint exteriorly thereof and observed after the pressurized region has been established. In any event, leakage will be indicated if a seal is not accomplished by the surfaces 24, 26 and 38, even though the stop surfaces 34, 44 and 48 are drawn tightly against one another. This positive assurance could not be had were the grooves 42, 46 not provided.

Figure 4:
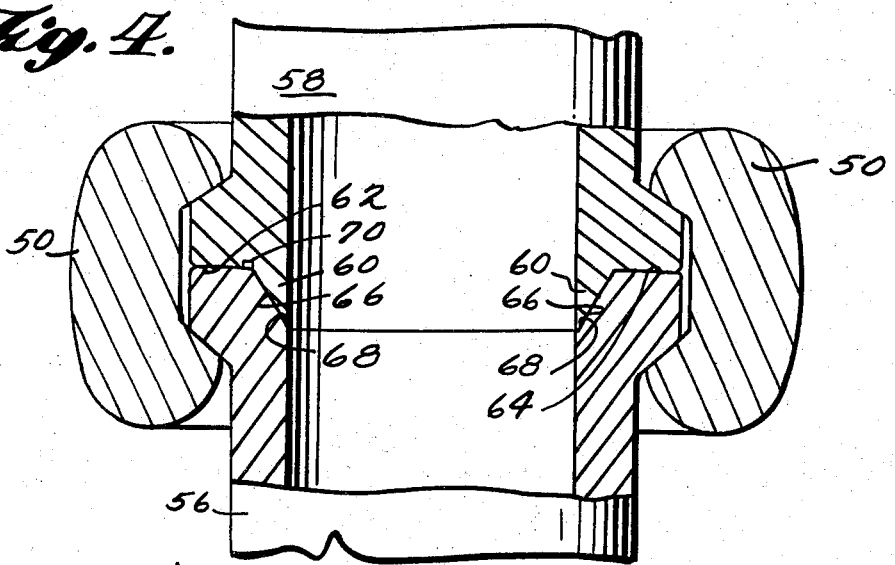
FIGURE 4 is a longitudinal sectional view similar to FIGURE 3 of another embodiment wherein the lip sealing surface and notch are on one of the conduit parts.

In the modification shown in FIGURE 4, two axially aligned conduits 56, 58 are provided with axially aligned throughbores. The conduit 56 is essentially similar to the conduit 12 or 14 of FIGURES 1 and 3. The conduit 58 is essentially similar to the combination of the ring 10 and conduit 14 or 12 of FIGURE 3 so that a conduit having an integral, axially directed, radially inner, elastically deflectable annular lip 60 is provided. The lip 60 is circumferentially surrounded by a stop shoulder 62 which projects generally radially and is adapted to abut the similar annular shoulder 64 of the conduit 56 to limit deflection of the lip 60 to within the elastic limit thereof. As can be seen in FIGURE 4, the lip 60 has an annular, outwardly facing frusto-conical sealing surface 66 thereon which has been deflected into stressed surface to surface sealing engagement with the frusto-conical sealing surface 68 of the conduit 56 radially inwardly of the shoulder 64 by drawing the conduits 56, 58 axially toward one another by a segmental wedging clamp 50 or the like.

According to the present invention a groove 70 has been formed in the stop shoulder 62 tangent to the lip 60 radially outer extent and extending throughout the full radial extent of the surface 62.

The groove 70 is similar in all material aspects to the grooves 42 and 46 and performs the same function, i.e. prohibiting the formation of an annular seal between the stop shoulders 62 and 64.

Figure 5:
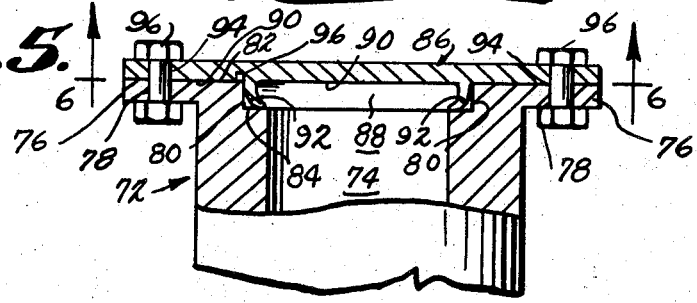
FIGURE 5 is a longitudinal sectional view similar to FIGURE 4 of another embodiment wherein one of the members of the sealing arrangement is a closure having a sealing surface that is curved as seen in longitudinal section.
Figure 6:
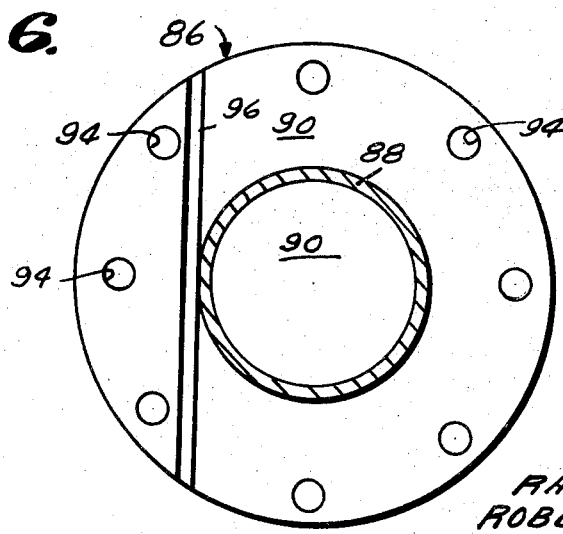
FIGURE 6 is a sectional view substantially around the line 6—6 of FIGURE 5.

The utilization of the principles of the present invention in a sealed joint of yet another construction is illustrated in FIGURES 5 and 6 wherein the conduit, or other fluid confining member such as a pressure vessel 72 is shown having an axial throughbore 74. At one end the member 72 is exteriorly enlarged to provide a circumferential, radially outwardly directed flange 76, shown having a plurality of arcuately spaced bolt receiving holes 78. The throughbore 74 is shown radially enlarged at 80 adjacent and opening toward the radially directed end surface 82. The juncture between the enlargement 80 and bore 74 remainder defines an annular sealing surface 84 which faces the end having the surface 82.

The bore 74 is blocked at the end having the surface 82 by a hatch cover, blank hub or disk-like closure or the like 86 having an integral annular, axially directed flexible lip 88 projecting from one surface 90 thereof. The lip 88 is shown having a radially outer face that is radially outwardly convex and convergent away from the surface 90 to define an annular sealing surface 92. Bolt receiving holes 94 complementary to the holes 78 are provided axially through the closure 86 and bolt and nut assemblies 96 are provided to draw the closure and conduit axially toward one another to establish the relationship illustrated in FIGURE 5.

The unstressed axial extent of the lip 88 from the surface 90 is such that as the closure and conduit are drawn toward one another the convex lip sealing surface 92 initially contacts the bore sealing surface 84 before the stop surfaces 82 and 90 have been brought into engagement. As the bolts are tightened further, bringing the surfaces 82 and 90 into engagement, the lip 88 elastically deflects inwardly thus forming an annular stressed seal between the surfaces 84 and 92. Sealing between the stop surfaces 82 and 90 is prevented by the provision of a groove 96 in the closure surface 90 tangent to the radially outer extent of the lip 88 at its base. The groove 96, shown especially well in FIGURE 6, is similar in all material respects to the grooves 42, 46 and 70 of the previously discussed embodiments, provides the same assurances and allows the same tests to be conducted.

It should be apparent that the principles of the present invention have broad applicability in stressed lip seals which include other abutting annular surfaces, which but for the provision of grooves according to the present invention, could between themselves form undesired secondary seals even when primary sealing had not been accomplished by the stressed lips. Exemplary sealing rings with which the present invention could be used to advantage are also shown in the commonly assigned, copending U.S. patent applications of Latham et al., Ser. No. 315,962, filed Oct. 14, 1963, Watts, John D., Ser. No. 186,586, filed Mar. 29, 1962 and Latham, Raymond E., Ser. No. 338,490, filed Jan. 17, 1964 and the U.S. patents to Watts, Patent No. 3,021,974; Pierce, Patent No. 3,095,110; Watts, Patent No. 3,055,537; Watts, Patent No. 3,150,889; and Latham, Patent No. 3,159,302. It is believed that those skilled in the art will receive adequate instruction from the foregoing detailed discussion to realize the manner in which the principles of the present invention relate to the constructions shown in the patents and patent applications just mentioned.

It should now be apparent that the embodiments discussed herein clearly teach the principles of the present invention and efficiently accomplish each of the objects of the present invention. Because the embodiments shown can be considerably modified without departing from the invention's principles or failing to accomplish its objects, the invention should be understood as encompassing all such modifications as are within the spirit and scope of the following claims.

We claim:

1. A sealing arrangement comprising: first and second fluid confining members, the first member and second member each having an end presented toward one another; means defining an annular sealing surface on said first member adjacent and facing outwardly of said first member end; means defining an annular, generally axially extending flexible lip on said second member adjacent said second member end and extending toward said first member end; said lip having a radially inner face and a radially outer face; means defining an annular sealing surface on one face of said lip obliquely extending with respect to the longitudinal axis of the second member; means defining an annular, generally radially directed stop shoulder on each of said members facing outwardly of said end of each circumferentially surrounding the annular sealing surface of each member; the flexible lip of said second member being arranged to engage the first member sealing surface prior to abutment of said stop shoulder and to thereafter deflect as said first and second members are drawn axially together with the sealing surface of said first member engaging the sealing surface of said second member to thereby effect a stressed sealing engagement of the first and second members; the stop shoulder on the first member being arranged to abut the stop shoulder on the second member to limit the deflection of the flexible lip; and means defining a groove in one of the stop shoulders, said groove extending between the radially inner and radially outer extent of said one stop shoulder and opening axially outwardly of said end of the member on which the groove is located to thereby prevent the formation of an annular seal between the stop shoulders upon the abutment of the stop shoulders and means drawing the first and second members toward one another and said stop shoulders into abutment.

2. The sealing arrangement of claim 1 wherein the first and second members are tubular conduits.

3. The sealing arrangement of claim 1 wherein one of the first and second members is an annular sealing ring.

4. The sealing arrangement of claim 3 wherein the sealing ring is generally T-shaped in longitudinal section and includes a second annular flexible lip coaxial with and proceeding opposite axial sense from the first-mentioned flexible lip the stop shoulder having said groove being located on an axially facing, radially extending surface defined at one longitudinal extreme of a radially directed annular rib on said sealing ring; means defining an annular sealing surface on the second flexible lip; an axially facing, radially extending surface defined at the opposite longitudinal extreme of said radially directed annular rib; and means defining a stop shoulder on the axially facing, radially extending surface defined at the opposite longitudinal extreme of said radially directed annular rib; and means defining a groove in the last-mentioned stop shoulder extending across the entire radial extent thereof and opening toward the opposite end of said sealing ring from said one end, said sealing ring being thereby adapted to effect a stressed seal with a third fluid confining member at the last-mentioned sealing surface of the sealing ring and prevent the effecting of an annular seal by the last-mentioned stop shoulder against the third fluid confining member.

5. The sealing arrangement of claim 1 wherein one of the first and second members is a closure.

6. The sealing arrangement of claim 1 wherein one of the first and second members is a tubular conduit.

7. The sealing arrangement of claim 1 wherein the flexible lip is composed of elastic hard metal.

8. The sealing arrangement of claim 1 wherein the radial inner extent of the grooved stop shoulder is coincident with the radially outer extent of the flexible lip.

9. The sealing arrangement of claim 8 wherein the groove is substantially rectilinear and is tangent to the flexible lip at the radially outermost extent of the flexible lip.

10. The sealing arrangement of claim 1 wherein the sealing surface on said flexible lip is frusto-conic.

11. The sealing arrangement of claim 10 wherein the sealing surface on said flexible lip is located on the radially outer face thereof.

12. The sealing arrangement of claim 1 wherein the sealing surface on said flexible lip is curvilinear as seen in longitudinal section.

13. The sealing arrangement of claim 4 wherein the two grooves on the sealing ring annular rib are parallel to one another, the first-mentioned groove being tangent to the first-mentioned flexible lip at the radially outermost extent of the flexible lip and the second-mentioned groove being tangent to the second-mentioned flexible lip at the radially outermost extent of the flexible lip.

14. A unitary continuous closed sealing ring of hard metal or the like comprising an inner annular flange portion with oppositely disposed flexible lips; an integral substantially centrally disposed radially extending external rib portion, said lips having exterior sealing surfaces which flare outwardly toward said rib portion; and means defining a groove extending across the entire radial extent of one face of said external rib portion.

15. The sealing ring of claim 14 further comprising means defining a groove extending across the entire radial extent of the opposite face of said external rib portion.

16. The sealing ring of claim 15 wherein each groove is tangential to said annular flange portion at the radially outer extent of said annular flange portion and wherein the grooves are parallel to one another.

References Cited

UNITED STATES PATENTS

| | | | |
|---|---|---|---|
| 1,497,652 | 6/1924 | Browne | 285—13 |
| 2,447,185 | 8/1948 | Keim | 285—13 |
| 2,477,533 | 7/1949 | Whiting | 285—110 X |
| 2,688,500 | 9/1954 | Scott | 285—13 |
| 2,746,486 | 5/1956 | Gratzmuller. | |
| 2,766,999 | 11/1956 | Watts et al. | 285 334.2 |
| 3,141,685 | 7/1964 | Watts | 285—93 |
| 3,290,047 | 12/1966 | Mayer | 277—2 |

FOREIGN PATENTS 496,085  8/1964  Italy.

CARL W. TOMLIN, *Primary Examiner.*

D. W AROLA, *Assistant Examiner.*